Feb. 2, 1965   E. G. PATRICK   3,168,108
FLUID VALVE
Filed Dec. 11, 1962   2 Sheets-Sheet 1
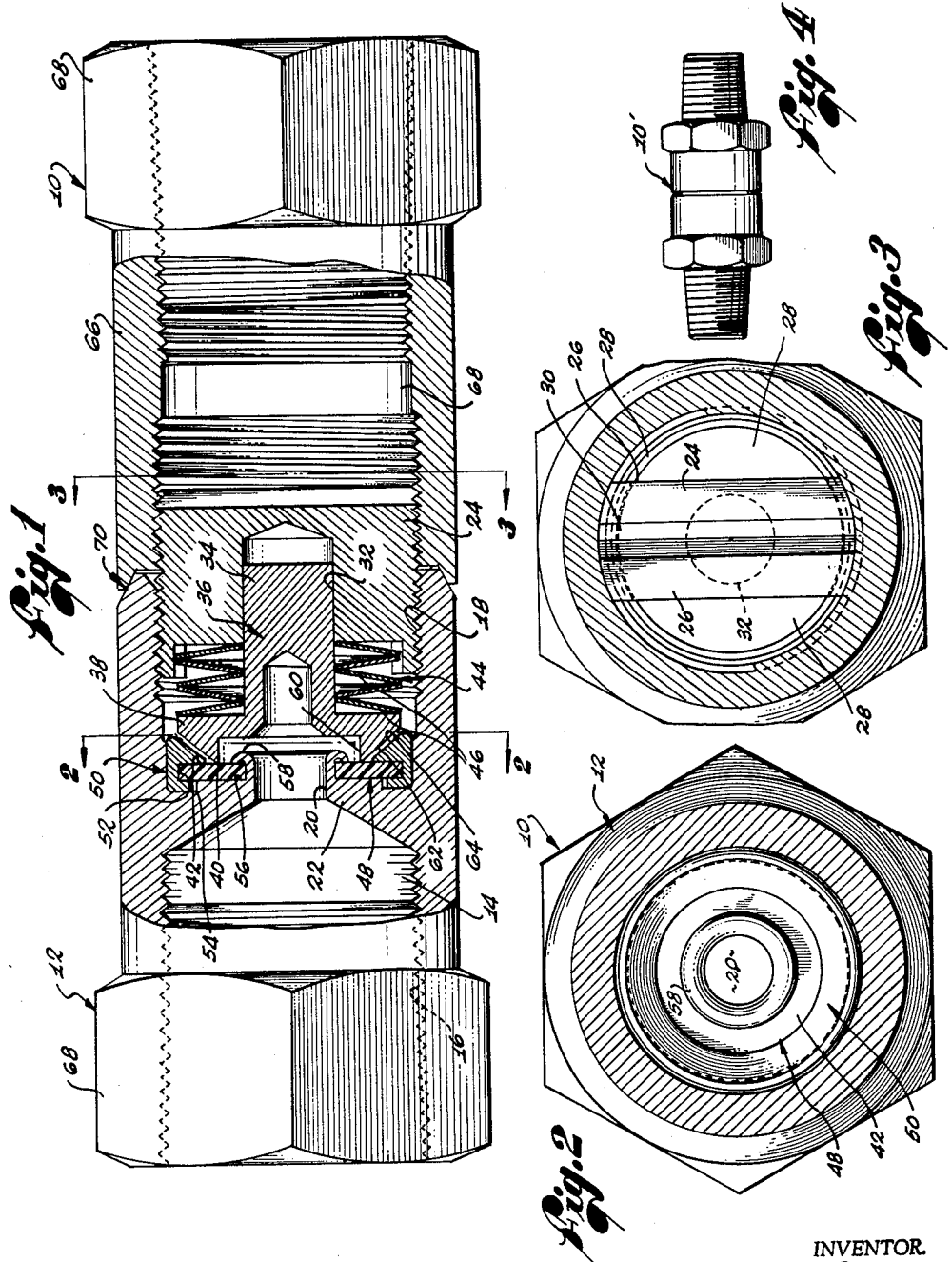
INVENTOR.
ERNEST G. PATRICK
BY Forrest J. Lilly
ATTORNEY

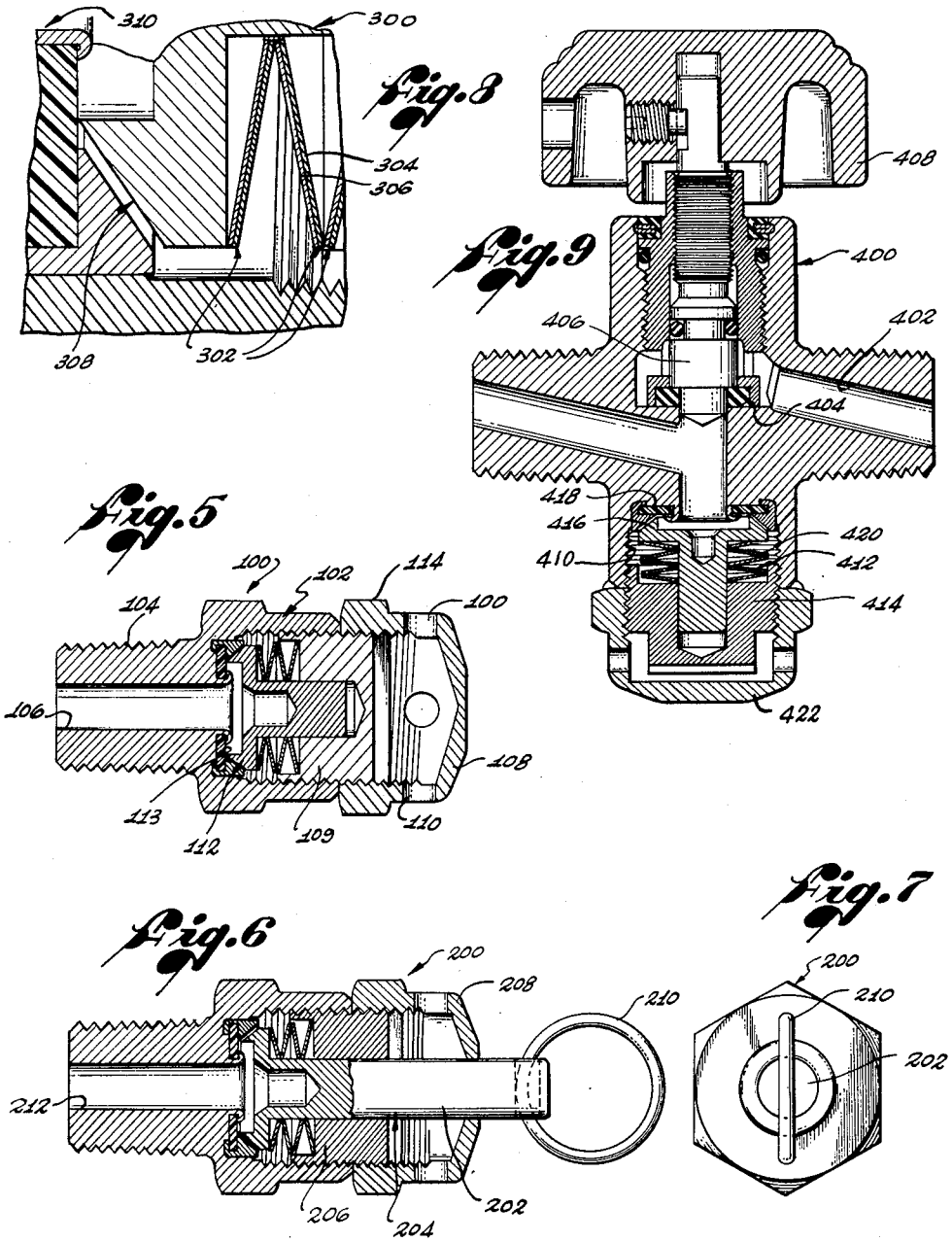

United States Patent Office 3,168,108
Patented Feb. 2, 1965

3,168,108
FLUID VALVE
Ernest G. Patrick, South Gate, Calif., assignor to Robbins Aviation, Inc., Los Angeles, Calif., a corporation of California
Filed Dec. 11, 1962, Ser. No. 243,785
3 Claims. (Cl. 137—542)

This invention relates generally to fluid pressure devices and particularly to improvements in fluid check and pressure relief valves.

There is a present need and demand for so-called miniaturized fluid flow control valves, which are not only small in size, but are economical to manufacture, and yet efficient and reliable in service.

A general object of the present invention is to provide an improved pressure relief and check valve which fully meets this demand.

An important object of the invention is to provide a valve having a unique and improved valve seat configuration.

Another important object of the invention is to provide a valve which opens completely when its cracking pressure is reached.

Another object of the invention is to provide a valve which may be actuated manually and/or by the pressure of the fluid being controlled and may serve either as a relief valve or as a check valve.

Yet another object of the invention is to provide a valve which may be designed for various applications, and which is ideally suited for use in high pressure, high flow rate fluid systems.

A further object of the invention is to provide a valve which is capable of replacing burst disc relief devices and fusible plug relief devices.

Yet a further object of the invention is to provide a valve having a valve closing spring, the spring rate of which may be simply and quickly adjusted.

Other objects, advantages, and features of the invention will become readily evident to those skilled in the art as the description proceeds.

Briefly, the objects of the invention are attained by providing a fluid flow control valve equipped with a valve body having a fluid passage therethrough defined, in part, by an enlarged threaded bore. Threaded in this bore is a valve obturator or poppet guide with an axial bore coaxial with and opening toward a valve seat on the valve body about the fluid passage therethrough. Slidably positioned in the poppet guide bore is the cylindrical stem of a valve poppet. The poppet has a flanged valve disc or head at the end of its stem proximate to the valve seat. This disc or head is formed with a frustoconical portion leading to an annular seating edge which sealingly engages the valve seat, to close the fluid passage, upon movement of the valve obturator toward the seat.

In those cases where the valve is designed to function as a check valve, the poppet may be either freely movable toward and away from the valve seat or may be urged with a light spring pressure toward the valve seat. In the case of a relief valve, the poppet is urged toward the valve seat by spring means, preferably Belleville springs (conical spring washers), positioned about the valve stem between the valve disc and the poppet guide.

The improved valve seat configuration of the invention consists of a valve seat insert of plastic, or other resilient material, which is confined or caged in the valve body in a new and unique way, so as to be sealed at both its inner and outer peripheries, and thus prevent fluid leakage past and distortion of the insert.

Several different valve body configurations, suitable for different applications, are disclosed herein. Moreover, in one illustrative form of the present valve, the poppet stem extends externally of the valve body to permit manual actuation of the valve. In another illustrative valve, the valve spring means comprise bimetal spring washers which effect opening of the valve in response to temperature. In all disclosed valve forms, the number and arrangement of the spring washers, or Belleville springs, may be quickly and easily changed to adjust the unseating or cracking pressure of the valve. The valve poppet and the valve body space in which its operates are uniquely designed so that the poppet will open wide when this cracking pressure is reached.

The invention will now be described in greater detail by reference to the attached drawings, wherein:

FIG. 1 is a side elevation, partially broken away, of an inline relief valve of the invention;

FIG. 2 is a section taken on line 2—2 in FIG. 1;

FIG. 3 is a section taken on line 3—3 in FIG. 1;

FIG. 4 is a side elevation, on reduced scale, of a modified inline relief valve of the invention;

FIG. 5 is a section through a modified relief valve of the invention;

FIG. 6 is a section through a relief valve of the invention having a manual overriding feature;

FIG. 7 is a right-hand end view of the valve in FIG. 6;

FIG. 8 is an enlarged partial section through a thermally responsive relief valve of the invention; and FIG. 9 is a section through a combined manual and pressure relief valve of the invention.

The valve 10 illustrated in FIGS. 1-4 of these drawings comprises a tubular valve body or sleeve 12 having a fluid passage 14 extending axially therethrough. The left-hand end of the fluid passage 14, as the valve is viewed in FIG. 1, is defined by a tapered, threaded bore 16 extending axially into the left-hand end of the valve body 12. The right-hand end of the fluid passage 14 is defined by a threaded cylindrical bore 18 extending axially into the right-hand end of the valve body. The intermediate portion of the fluid passage 14 is substantially reduced in diameter and defined by a smooth walled bore 20 extending axially through an internal annular wall or shoulder 22 within the valve body 12.

Threaded in the bore 18 of the valve body is an externally threaded poppet guide 24. The right-hand end of this poppet guide, as it is viewed in FIG. 1, projects beyond the right-hand end of the valve body for reasons to be explained presently. As may be observed best in FIG. 3, opposite sides of the poppet guide 24 are machined away to provide the guide with opposite flat faces 26 and a reduced thickness in a direction normal to these faces. The clearance spaces thus formed between the poppet guide faces 26 and the opposing wall of the bore 18 define fluid passages 28 through which fluid flowing through the main valve passage 14 may flow around the guide 24. Formed in the right-hand end face of the poppet guide 24 is a kerf 30 which is adapted to receive the blade of a screwdriver, or the like, for threading the guide into and out of its bore 18.

Extending axially into the left-hand end of the poppet guide 24 is a bore 32. This bore slidably receives the stem 34 of a valve obturator or poppet 36. On the left-hand end of the poppet stem 34, the poppet 36 is formed with a radially enlarged valve disc or head 38. The left-hand face of this valve disc has an annular seating edge 40 adapted for fluid sealing engagement with a valve seat 42 on the valve body 12 about the reduced intermediate portion 20 of the fluid passage 14.

Mounted on the poppet stem 34, and seating at one end against the left-hand face of the poppet guide 24 and at the other end against the right-hand face of the valve disc 38 on the poppet, are spring means 44 which urge the poppet 36 toward and into fluid sealing contact with the valve seat 42. The left-hand end of the poppet guide 24 is counterbored, as shown, to form a seat for the spring means 44.

Spring means 44 preferably comprises a stack of conical spring washers, or Belleville springs, 46. As will be presently explained, these spring washers may be arranged in various ways. In FIG. 1, however, the adjacent spring washers 46 are inverted so that each spring washers has its outer peripheral edge disposed in seating contact with the outer peripheral edge of the adjacent washer at one side thereof and its inner peripheral edge disposed in seating contact with the inner peripheral edge of its other adjacent washer. Threaded adjustment of the poppet guide 24 into and out of its bore 18 obviously adjusts the predeflection of the spring washers 46 and, thereby, the force with which the poppet 36 is retained in sealing contact with its valve seat 42.

While various valve seat configurations may be employed in the valve, the illustrated seat configuration is preferred. This illustrated valve seat comprises an annular resilient valve seat insert or annulus 48 composed of plastic, or other suitable resilient valve seat material. Fitted tightly in the valve body about the outer edge of the valve seat insert or seating annulus 48 is a generally ring-shaped seat retainer 50. This seat retainer has an internal annular groove 52 which receives the outer peripheral edge of the valve seat insert 48. According to one method of manufacture, the seat retainer 50 is bored at one end to receive the seat insert 48. After the seat insert is positioned in the bore of the seat retainer, the end of the retainer is crimped over the outer edge of the seat insert, as illustrated at 54. According to an alternate method of manufacture, the groove 52 is milled in the seat retainer after which the valve seat insert 48 is snapped into position in the groove. The seat retainer will be seen to have a flange portion which overlies, seals to and protects the outer peripheral edge of the plastic seating annulus and a marginal area of said annulus around the otherwise exposed front face thereof. Thereby, high pressure fluid is prevented from getting under the outer periphery of seat or seating annulus 48.

The valve seat insert 48 and its retainer 50 are positioned within an annular, axially facing recess 56 in the downstream side of the internal body shoulder 22. This recess is contoured to complement the seat insert 48 and the retainer 50 so that both the insert and the retainer seat against the bottom seating face of the recess, as shown. The recess 56 is formed in such a way that a relatively thin rim or lip 58 of metal is left on the inner body shoulder 22 between the inner annular edge of the valve seat insert 48 and the bore 20. Initially this lip 58 is cylindrical and extends beyond the valve seat 42 coaxially with bore 20. After assembly of the valve seat insert 48 and its retainer 50 in the recess 56, the lip 58 is crimped over the inner edge of the seat insert, in the manner shown. This crimped edge of the lip 58 serves the dual function of retaining the seat insert and its retainer in position in the recess 56 and preventing fluid leakage around the underside of the insert. To this end, the lip 58 is crimped in such a way that it is indented into the insert. The marginal portion of the front face of the seat insert covered over by the overlying portion of the seat retainer is also effective in preventing high pressure fluid from getting under the seat insert.

When the valve seat insert 48 comprises resilient plastic, as described, the seating edge 40 of the poppet 36 is preferably relatively sharp, as shown, so that it "bites" into the plastic of the insert. In the illustrated poppet, for example, the seating edge 40 is defined by the intersection of the cylindrical wall 60 of a shallow bore extending axially into the left-hand face of the valve disc 38 of the poppet and an outer frusto-conical face 62 on the valve disc about the shallow bore. The annular face 64 of the seat retainer 50 which confronts the conical poppet face 62 is of frusto-conical form, as shown, to complement the poppet face. When the poppet is disposed in its closed position of sealing contact with the valve seat 42, a slight clearance space, of relatively small volume, exists between the poppet face 62 and the retainer face 64.

Threaded on the right-hand extending end of the poppet guide 24 is a sleeve 66. This sleeve has a fluid passage 68 extending therethrough and communicating with the fluid passages 28 at opposite sides of the poppet guide 24. The valve body 12 and the sleeve 66 have external polygonal portions 68 by which they may be rotated to effect connection and disconnection thereof. The abutting ends of the valve body 12 and the sleeve 66 are sealed together to prevent fluid leakage therebetween. In the drawings, this fluid seal between the valve body and the sleeve is furnished by the interfitting tongue and groove configuration 70 of the abutting ends of the body and sleeve which provides these ends with conically tapered sealing surfaces that are urged into fluid sealing contact when the valve body 12 and sleeve 66 are threaded together.

The valve described above is designed to serve as an inline pressure relief valve. That is to say, the valve is designed to be connected between two sections of a fluid line. One fluid line section is threaded into the bore 16 in the valve body 12 and the other fluid line section is threaded into a bore 76 in the sleeve 66. Alternatively, the valve may be provided with externally threaded coupling ends, as illustrated on the valve 10' in FIG. 4.

The operation of the valve 10 is immediately evident from the preceding description. Thus, the conical spring washers 46, comprising the spring means 44 of the valve, normally retain the seating edge 40 of the poppet 36 in sealing contact with the valve seat 42. Pressure fluid enters the valve through the left-hand end of the valve passage 14, as the valve is viewed in FIG. 1. The pressure of this fluid, therefore, acts on the left-hand face of the poppet 36 inside the seating edge 40 in opposition to the spring washers 46. So long as the fluid pressure remains below that which will unseat the poppet 36 against the action of the conical spring washers 46, the poppet remains closed and no fluid flow occurs through the valve. If the fluid pressure exceeds this unseating pressure of the poppet, the latter opens to permit fluid, in some cases only a few bubbles, to flow past the seating edge 40 of the poppet. Any such flow goes through the small volume clearance space between surfaces 62 and 64 to the large body bore 18, and then through the fluid passages 28 at opposite sides of the poppet guide 24, into the fluid passage 68 through the sleeve 66. If the pressure of the fluid entering the valve drops below that necessary to retain the poppet in its open position against the action of the conical spring washers 46, the latter return the poppet 36 to its closed position. The slight conical clearance space between surfaces 62 and 64 as the poppet reaches its closed position affords a fluid pressure cushioning and centralizing influence on the poppet which results in its tending always to seat in a precisely centered position, notwithstanding some slight play in the fit of stem 36 in bore 34. Hence there is avoided any problem of lack of good seating and sealing owing to slightly uncontrolled wear on the plastic seat.

While other types of springs than conical spring washers may be used in the valve, conical spring washers are preferred since they exhibit a decrease in spring rate as they deflect. Thus, once the pressure of the fluid entering the valve becomes sufficient to unseat the poppet 36, the latter opens fully. This full opening action of the poppet is aided by the fact that once the seating edge 40 of the poppet disengages its valve seat 42, the pressure of the fluid flowing past the seating edge and between the conical poppet face 62 and the opposing face 64 of the seat retainer 50 acts on the full area of the poppet face 62 to force the poppet open. When the seating edge first cracks from the plastic insert, the volume of the space between poppet face 62 and face 64 is still relatively slight, and the relatively small amount of pressure fluid flowing to this space is active on face 62 to aid in opening the valve. The total force then acting to open the poppet then overcomes the high initial resistance of the conical springs 46, which thereupon collapse, with decreasing resistance, so that the poppet then opens wide.

It is evident that the spring rate of the valve spring means 44 may be adjusted by adding more conical spring washers to the valve or removing some of the washers from the valve. The spring rate may also be varied, to a degree, by positioning the spring washers in various ways.

The valve 100 illustrated in FIG. 5 comprises a valve body 102 having an externally threaded coupling end 104. Extending axially through this threaded end of the valve body is a bore 106 which forms a fluid passage corresponding to the fluid passage 14 in the valve 10 of FIGS. 1–3. Valve 100 is otherwise identical to the earlier valve 10 except that in valve 100, a cap 108 is threaded on the extending end of the poppet guide 109 in place of the sleeve 66 in FIGS. 1–3. Cap 108 has a multiplicity of vent openings 110 through which fluid flowing through the valve, when the poppet 112 thereof is lifted from its valve seat 113 by the pressure of fluid entering the valve through the passage 106, may escape to atmosphere. Cap 108 has an enlarged, knurled shoulder 114 by which it may be threaded on the poppet guide 109.

The valve 200 of FIGS. 6 and 7 is identical in every respect to the valve 100 of FIG. 5 except that the stem 202 of the valve poppet 204 in valve 200 extends completely through the poppet guide 206 and the vent cap 208 to the exterior of the valve. Secured to this extending end of the poppet stem is a ring 210 by which the poppet may be manually lifted from its valve seat 211. The valve 200, then, has a manual overriding feature whereby the valve may be manually opened at any time by pulling on the ring 210. Otherwise, of course, the valve poppet 204 remains in sealing contact with its valve seat until the pressure of fluid entering the valve through the valve inlet passage 212 attains the unseating pressure of the valve.

The thermally responsive pressure relief valve 300 of FIG. 8 is identical with the valve 100 of FIG. 5 with the exception that the spring washers of the latter valve are replaced, in the valve 300, by spring washers 302 which comprise a bimetal construction. Thus, referring to FIG. 8, it will be observed that each spring washer 302 consists of two halves 304 and 306 which are bonded together. These halves of each spring washer are composed of metals having different coefficients of thermal expansion.

The spring washers 302 are designed so that when the ambient temperature is less than a predetermined maximum temperature, the valve functions as an ordinary pressure relief valve. When the ambient temperature exceeds this predetermined maximum temperature, the different coefficients of thermal expansion of the two metals of each spring washer 302 cause the washers to deflect in a direction to relieve the pressure on the valve poppet 308. With the pressure on the poppet thus relieved, the pressure of the fluid entering the valve through the valve inlet 310 can unseat the poppet 308 even though the inlet fluid pressure is appreciably less than that normally required to unseat the poppet. For example, the bimetal spring washers 302 of the valve can be designed to permit opening of the valve in response to the ambient temperature reaching a predetermined maximum temperature at any anticipated minimum inlet fluid pressure to the valve. In this way, the valve will open in response to the ambient temperature irrespective of the fluid pressure at the valve inlet.

Referring now to FIG. 9, there is illustrated a valve 400 having a fluid passage 402 extending therethrough. About this fluid passage is a valve seat 404. Included in the valve is a valve obturator 406 which is adjustable, by rotation of a valve handle 408, into and out of seating contact with the valve seat 404 to control fluid flow through the passage 402.

Extending into the external surface of the valve body 400 is a threaded bore 410. Positioned in this bore is a pressure relief valve mechanism 412 which is substantially identical to that embodied in the valves of FIGS. 1–5. Thus, the valve mechanism 412 comprises a poppet guide 414 threaded in the bore 410 and supporting a poppet 416 for movement into and out of seating contact with its valve seat 418. The poppet is urged into contact with the valve seat by conical spring washers 420 about the poppet stem.

The end of the poppet guide 414 projects beyond the valve body 400. Threaded on this projecting end of the valve guide is a vent cap 422.

From this description, it is evident that so long as the inlet pressure to the valve 400 is less than the unseating pressure of the valve mechanism 412, flow through the valve passage 402 is regulated solely by the valve handle 408. If the inlet pressure to the valve passage exceeds the unseating pressure of the valve mechanism 412, the valve poppet 416 unseats to vent the excess fluid pressure to atmosphere through the vent ports in the cap 422.

Clearly, therefore, the invention hereinbefore described and illustrated is fully capable of attaining the several objects and advantages preliminarily set forth.

While certain presenting preferred embodiments of the invention have been disclosed for illustrative purposes, numerous modifications in the design, arrangement of parts, and instrumentalities of the invention are possible within the spirit and scope of the following claims.

What is claimed is:

1. A valve comprising:

a valve body having a fluid inlet, a fluid outlet, and a fluid passage therebetween including a bore leading from said inlet, and a downstream passage portion of larger cross section than said bore leading beyond said bore toward said outlet, an annular seating face on said body around said bore facing toward said downstream portion of said fluid passage, a seating annulus in said body around said bore positioned adjacent said seating surface, a valve poppet guided for axial movement toward and from said seating annulus, said poppet embodying an annular head having a front, annular, coaxial seating edge projecting therefrom toward said seating annulus and being sealingly engageable therewith, said poppet head having an annular surface rearward of the plane of said annular seating edge and radially outside thereof, said annular surface having a projected area facing in the same direction as said seating edge, wall means fixed with said valve body presenting an annular wall surface coaxial with said annular surface on said poppet head and at slight spacing distance from said annular surface on said poppet head when said seating edge is in engagement with said seating annulus, in such arrangement as to afford in such position, in a zone between said annular surfaces on said poppet head and wall means and outside said seating edge, a fluid space of relatively small volume into which fluid is admitted when said seating edge separates slightly from said seating annulus, and conical spring washer means, of variable spring rate, seated in said valve body for urging said poppet to a position of engagement of its annular seating edge with said seating annulus.

2. The subject matter of claim 1, wherein:
said annular surface on said poppet head, outside said annular seating surface, is frusto-conical in form.

3. The subject matter of claim 1, wherein:
the end portion of said bore opposite from said inlet is defined by a tubular portion of material of the valve body which protrudes through said seating annulus and is turned over and seals the otherwise exposed inner margin thereof, and including holding and sealing means for the outer peripheral region of said seating annulus, said holding and sealing means being fixed with said valve body, and including a wall portion engaging and sealing to an outer marginal portion of the front face of said seating annulus.

References Cited by the Examiner

UNITED STATES PATENTS

| | | | |
|---|---|---|---|
| 1,206,625 | 11/16 | Vetter | 137—79 XR |
| 1,607,363 | 11/26 | Prescott | 251—323 XR |
| 1,785,271 | 12/30 | Lemex | 137—542 XR |
| 2,214,250 | 9/40 | Landrum | 251—323 XR |
| 2,446,334 | 8/48 | Koehler | 251—259 |
| 2,524,951 | 10/50 | Ashton | 137—542 |
| 2,750,958 | 6/56 | Baker et al. | 137—543 XR |
| 2,888,949 | 6/59 | Evans | 251—333 XR |
| 2,973,008 | 2/61 | Klose | 137—543 XR |

LAVERNE D. GEIGER, *Primary Examiner.*

MILTON KAUFMAN, *Examiner.*